United States Patent
Wang

(10) Patent No.: US 10,848,310 B2
(45) Date of Patent: Nov. 24, 2020

(54) METHOD AND DEVICE FOR IDENTIFYING USER IDENTITY

(71) Applicant: Alibaba Group Holding Limited, Grand Cayman (KY)

(72) Inventor: Hua Wang, Zhejiang (CN)

(73) Assignee: Alibaba Group Holding Limited, Grand Cayman, KY (US)

(*) Notice: Subject to any disclaimer, the term of this patent is extended or adjusted under 35 U.S.C. 154(b) by 2 days.

(21) Appl. No.: 15/636,505

(22) Filed: Jun. 28, 2017

(65) Prior Publication Data

US 2017/0302451 A1 Oct. 19, 2017

Related U.S. Application Data

(63) Continuation of application No. PCT/CN2015/098259, filed on Dec. 22, 2015.

(30) Foreign Application Priority Data

Dec. 31, 2014 (CN) .......................... 2014 1 0854914

(51) Int. Cl.
*H04L 29/06* (2006.01)
*H04L 9/32* (2006.01)
(Continued)

(52) U.S. Cl.
CPC ............ *H04L 9/3213* (2013.01); *G06F 21/41* (2013.01); *G06Q 20/0855* (2013.01);
(Continued)

(58) Field of Classification Search
CPC ..... H04L 9/3213; H04L 9/3234; H04L 9/083; H04L 63/0407; H04L 63/0807;
(Continued)

(56) References Cited

U.S. PATENT DOCUMENTS 6,529,886 B1 3/2003 Campana et al.
6,748,056 B1 * 6/2004 Capriotti ............... H04L 51/066
379/88.17

(Continued)

FOREIGN PATENT DOCUMENTS

CN 103607284 A 2/2014
CN 103795728 A 5/2014
(Continued)

OTHER PUBLICATIONS

Translation of First Office Action from corresponding CN Patent Application No. 201410854914.4, dated Jun. 5, 2018, 4 pages.
(Continued)

*Primary Examiner* — Kendall Dolly
*Assistant Examiner* — Kevin Ayala
(74) *Attorney, Agent, or Firm* — Lee & Hayes, P.C.

(57) ABSTRACT

A method and an apparatus for identifying a user identity are disclosed. The method includes receiving, by a first platform, a first request sent by a second platform, the first request including a first identifier, the first identifier being a sequence number used for identifying the second platform and allocated to the second platform by the first platform after the second platform accesses the first platform; obtaining a second identifier corresponding to the first identifier, the second identifier being a sequence number used for identifying an identity of the second platform in the first platform; obtaining a third identifier corresponding to the first request, the third identifier being an account of a login user currently logging on to the first platform; encrypting the third identifier using the second identifier to obtain a fourth identifier; and returning the fourth identifier to the second platform.

20 Claims, 5 Drawing Sheets

(51) Int. Cl.
| | | |
|---|---|---|
| G06Q 20/08 | (2012.01) | |
| G06Q 20/12 | (2012.01) | |
| G06Q 20/38 | (2012.01) | |
| G06F 21/41 | (2013.01) | |
| H04L 9/08 | (2006.01) | |
| H04L 29/08 | (2006.01) | |

(52) U.S. Cl.
CPC ........... *G06Q 20/12* (2013.01); *G06Q 20/383* (2013.01); *G06Q 20/3829* (2013.01); *G06Q 20/38215* (2013.01); *H04L 9/083* (2013.01); *H04L 9/3234* (2013.01); *H04L 29/06* (2013.01); *H04L 63/0407* (2013.01); *H04L 67/24* (2013.01); *H04L 67/306* (2013.01); *G06F 2221/2149* (2013.01); *H04L 63/0807* (2013.01)

(58) Field of Classification Search
CPC ... H04L 67/24; H04L 67/306; G06Q 30/0601; G06Q 20/383; G06Q 20/12; G06Q 20/0855; G06F 2221/2149
USPC .......................................................... 713/159
See application file for complete search history.

(56) References Cited

U.S. PATENT DOCUMENTS

| | | | | |
|---|---|---|---|---|
| 8,201,217 | B1* | 6/2012 | Begen | H04L 63/0815 726/12 |
| 2011/0167003 | A1* | 7/2011 | Nice | G06Q 30/0271 705/50 |
| 2013/0024919 | A1* | 1/2013 | Wetter | G06F 21/335 726/6 |
| 2014/0013396 | A1 | 1/2014 | Field-Eliot et al. | |
| 2014/0033291 | A1* | 1/2014 | Liu | H04L 67/20 726/7 |
| 2014/0129447 | A1 | 5/2014 | Ranalli et al. | |
| 2015/0089569 | A1* | 3/2015 | Sondhi | H04L 63/08 726/1 |
| 2015/0106900 | A1* | 4/2015 | Pinski | H04W 12/06 726/7 |
| 2016/0026827 | A1* | 1/2016 | Ko | G06F 21/6209 713/193 |

FOREIGN PATENT DOCUMENTS

| | | |
|---|---|---|
| CN | 104038486 A | 9/2014 |
| JP | 2004206474 A | 7/2004 |
| JP | 2004295761 A | 10/2004 |
| JP | 2007072661 A | 3/2007 |
| JP | 2011145754 A | 7/2011 |

OTHER PUBLICATIONS

The Extended European Search Report dated Jul. 30, 2018, for European Application No. 15875144.6, 7 pages.
Translation of International Search Report from corresponding PCT Application No. PCT/CN2015/098259, dated Mar. 11, 2016, 2 pages.
Sakimura: "Draft: OpenID Connect Core 1.0—draft 21 incorporating errata set 1", Sep. 16, 2014, Retreived from URL:http://openid.net/specs/openid-connect-core-1_0-21.html [retrieved on Aug. 4, 2017], pp. 1-94.
Translation of Written Opinion from corresponding PCT Application No. PCT/CN2015/098259, dated Mar. 11, 2016, 5 pages.
First Chinese Office Action dated Jun. 5, 2018 for Chinese patent application 201410854914.4, a counterpart foreign application of U.S. Appl. No. 15/636,505, 5 pages.
The Koren Office Action dated Feb. 7, 2020 for Korean Patent Application No. 2017-7017848, a counterpart of U.S. Appl. No. 15/636,505, 7 pages.
First Chinese Office Action dated Jun. 5, 2018 for Chinese patent application 201410854914.4, a counterpart foreign application of U.S. Application No. 15/636,505, 5 pages.
The European Office Action dated Aug. 21, 2019, for European Patent Application No. 15875144.6, a counterpart of U.S. Appl. No. 15/636,505, 6 pages.
The Japanese Office Action dated Apr. 2, 2019 for Japanese Patent Application No. 2017-535035, a counterpart of U.S. Appl. No. 15/636,505, 11 pages.
The European Office Action dated Mar. 31, 2020 for European Patent Application No. 15875144.6, a counterpart foreign application of the U.S. Appl. No. 15/636,505, 4 pages.
The Singapore Office Action dated May 30, 2020 for Singapore Patent Application No. 10201905912U, a counterpart foreign application of teh U.S. Appl. No. 15/636,505, 5 pages.
Indian Office Action dated Sep. 18, 2020 for Indian Patent Application No. 201717021451, a counterpart foreign application of U.S. Appl. No. 15/636,505, 8 pages.

* cited by examiner

METHOD AND DEVICE FOR IDENTIFYING USER IDENTITY

CROSS REFERENCE TO RELATED PATENT APPLICATIONS

This application claims priority to and is a continuation of PCT Patent Application No. PCT/CN2015/098259, filed on 22 Dec. 2015, and is related to and claims priority to Chinese Patent Application No. 201410854914.4, filed on 31 Dec. 2014, entitled "Request Method and Device for Identifying User Identity," which is hereby incorporated by reference in its entirety.

TECHNICAL FIELD

The present disclosure relates to the field of identity recognition technologies, and in particular, to methods for identifying a user identity and apparatuses for identifying a user identity.

BACKGROUND

With the rapid development of information technology, more and more services need to be accomplished cooperatively via a plurality of platforms. For example, interactions between an e-commerce platform and a third-party electronic payment platform exist in a shopping process of a user in the field of electronic commerce. Apparently, a transfer of user information is involved during the interactions.

Generally, a third-party electronic payment platform returns a parameter to an e-commerce platform through an interface to inform thereof a user ID (UID) of a current payer. At present, the third-party electronic payment platform returns the same UID to different e-commerce platforms. Since system security of most e-commerce platforms is not strong, it is very likely that a hacker may perform data collection on information of the different e-commerce platforms based on this UID, and the risk of a payment account of the user being stolen thus increases.

For example, the same user "A" uses the same payment account to conduct transactions on two websites A and B respectively. The website A uses a joint login product of a third-party electronic payment platform to get a mobile phone number, a name, and a UID of the user after receiving an authorization from the user. The website B uses the joint login product of the third-party electronic payment platform to get an ID card number, the name, and the UID of the user after receiving an authorization from the user. Suppose that databases of the two websites A and B are both leaked. A hacker can get information such as UID+name+ID card number+mobile phone number of the user using the UID as a connecting point. As more data is exposed, more information of the user is obtained. As such, the risk of the payment account of the user being stolen gradually increases.

Therefore, a technical problem to be urgently solved by one skilled in the art at present is to provide a mechanism of identifying a user identity, to enhance the security of user information and reduce the risk of the user information being stolen due to data collection.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure aims to provide a method and an apparatus for identifying a user identity, to enhance the security of user information and reduce the risk of the user information being stolen due to data collection.

In order to solve the aforementioned problem, the present disclosure discloses a method for identifying a user identity. In implementations, the method may include receiving a first request sent from a second platform at a first platform, the first request including a first identifier, the first identifier being a sequence number for identifying the second platform and allocated to the second platform by the first platform after the second platform accesses the first platform; obtaining a second identifier corresponding to the first identifier, the second identifier being a sequence number in the first platform for identifying an identity of the second platform; obtaining a third identifier corresponding to the first request, the third identifier being an account of a login user currently logging on to the first platform; encrypting the third identifier using the second identifier to obtain a fourth identifier, the fourth identifier being a sequence number used for identifying the login user and returned to the second platform by the first platform; and returning the fourth identifier to the second platform.

In implementations, the first request may further include a first service processing parameter. Prior to encrypting the third identifier using the second identifier to obtain the fourth identifier, the method may further include performing corresponding service processing on the first service processing parameter based on the third identifier to obtain a first service processing result.

In implementations, the method may further include returning the first service processing result at the same time when the fourth identifier is returned to the second platform.

In implementations, prior to receiving the first request sent by the second platform at the first platform, the method may further include presenting an authorization page; obtaining a call-back address corresponding to the second platform; adding a preset authorization code to the call-back address upon detecting an authorization operation of a user in the authorization page is detected, and jumping to a page corresponding to the call-back address; and returning a corresponding authorization token to the second platform responsive to a token request after receiving the token request sent by the second platform, the token request including an authorization code.

In implementations, receiving the first request sent by the second platform at the first platform includes detecting, by the first platform, that the second platform uses the authorization token to call a corresponding API interface in the first platform; and receiving, by the first platform, the first request introduced by the second platform through the API interface.

In implementations, the third identifier includes a special label, and obtaining the third identifier corresponding to the first request includes positioning an API interface corresponding to the authorization token; checking whether parameters in the API interface include a parameter of the special label; and obtaining the parameter including the special label as the third identifier if affirmative.

In implementations, obtaining the second identifier corresponding to the first identifier includes obtaining an association database, the association database including an association relationship between the first identifier and the second identifier; matching the first identifier in the association database; and obtaining the second identifier that matches the first identifier.

In implementations, the encrypting the third identifier using the second identifier to obtain the fourth identifier includes obtaining an encryption key; and encrypting the third identifier using the encryption key and the second identifier to obtain the fourth identifier.

The present disclosure further discloses a method for identifying a user identity. In implementations, the method may include receiving a second request sent by a second platform at a first platform, the second request including a first identifier and a fourth identifier, wherein the first identifier is a sequence number allocated to the second platform by the first platform for identifying the second platform after the second platform accesses the first platform; and the fourth identifier is a sequence number returned to the second platform by the first platform and used for identifying a login user currently logging on to the first platform; obtaining a second identifier corresponding to the first identifier, the second identifier being a sequence number in the first platform for identifying an identity of the second platform; and decrypting the fourth identifier using the second identifier to obtain a third identifier, the third identifier being an account of the login user currently logging on to the first platform.

In implementations, the second request may further include a second service processing parameter. After decrypting the fourth identifier using the second identifier to obtain the third identifier, the method may further include performing corresponding service processing on the second service processing parameter based on the third identifier, to obtain a second service processing result; encrypting the third identifier using the second identifier to obtain the fourth identifier; and returning the fourth identifier and the second service processing result to the second platform.

In implementations, decrypting the fourth identifier using the second identifier to obtain the third identifier may include obtaining a decryption key; and decrypting the fourth identifier using the decryption key and the second identifier to obtain the third identifier.

In implementations, after decrypting the fourth identifier using the second identifier to obtain the third identifier, the method may further include adding a special label to the third identifier.

The present disclosure further discloses an apparatus for identifying a user identity. The apparatus includes a first request receiving module configured to receive a first request sent by a second platform, the first request including a first identifier, the first identifier being a sequence number allocated to the second platform by the first platform and used for identifying the second platform after the second platform accesses the first platform; a second identifier acquisition module configured to obtain a second identifier corresponding to the first identifier, the second identifier being a sequence number used for identifying an identity of the second platform in the first platform; a third identifier acquisition module configured to obtain a third identifier corresponding to the first request, the third identifier being an account of a login user currently logging on to the first platform; an encryption module configured to encrypt the third identifier using the second identifier to obtain a fourth identifier, the fourth identifier being a sequence number that is returned to the second platform by the first platform and is used for identifying the user; and an identifier returning module configured to return the fourth identifier to the second platform.

In implementations, the first request may further include a first service processing parameter, and the apparatus further includes a first service processing module configured to perform corresponding service processing on the first service processing parameter based on the third identifier, to obtain a first service processing result.

In implementations, the apparatus may further include a first result returning module configured to return the first service processing result at the same time when the fourth identifier is returned to the second platform.

In implementations, the apparatus may further include an authorization page presentation module configured to present an authorization page; a call-back address acquisition module configured to obtain a call-back address corresponding to the second platform; an authorization code adding module configured to add a preset authorization code to the call-back address in response to detecting an authorization operation of a user in the authorization page, and jump to a page corresponding to the call-back address; and an authorization module configured to return a corresponding authorization token to the second platform responsive to a token request, upon receiving the token request sent by the second platform, wherein the token request includes an authorization code.

In implementations, the first request receiving module may include an interface calling sub-module configured to detect that the second platform uses the authorization token to call a corresponding API interface in the first platform; and a request receiving sub-module configured to receive the first request from the second platform through the API interface.

In implementations, the third identifier may include a special label. The third identifier acquisition module may include an interface positioning sub-module configured to position an API interface corresponding to the authorization token; an interface determination sub-module configured to check whether parameters in the API interface include a parameter of the special label; and an identifier obtaining sub-module configured to obtain the parameter including the special label as the third identifier in response to the parameters in the API interface including the parameter of the special label.

In implementations, the second identifier acquisition module includes an association database obtaining sub-module configured to obtain an association database, the association database including an association relationship between the first identifier and the second identifier; a matching sub-module configured to match the first identifier in the association database; and a second identifier obtaining sub-module configured to obtain the second identifier that matches the first identifier.

In implementations, the encryption module may include a key acquisition sub-module configured to obtain an encryption key; and an encryption sub-module configured to encrypt the third identifier using the encryption key and the second identifier to obtain the fourth identifier.

The present disclosure further discloses an apparatus for identifying a user identity. In implementations, the apparatus may include a second request receiving module configured to receive a second request sent by a second platform, the second request including a first identifier and a fourth identifier, wherein the first identifier is a sequence number used for identifying the second platform and allocated to the second platform by the first platform after the second platform accesses the first platform, and the fourth identifier is a sequence number returned to the second platform by the first platform and used for identifying the user; a second identifier acquisition module configured to obtain a second identifier corresponding to the first identifier, the second identifier being a sequence number used for identifying an identity of the second platform in the first platform; and a decryption module configured to decrypt the fourth identifier using the second identifier to obtain a third identifier, the third identifier being an account of the login user currently logging on to the first platform.

In implementations, the second request may further include a second service processing parameter. The apparatus may further include a second result obtaining module configured to perform corresponding service processing on the second service processing parameter based on the third identifier to obtain a second service processing result; an encryption module configured to encrypt the third identifier using the second identifier to obtain the fourth identifier; and a result sending module configured to return the fourth identifier and the second service processing result to the second platform.

In implementations, the decryption module may include a key acquisition sub-module configured to obtain a decryption key; and a decryption sub-module configured to decrypt the fourth identifier using the decryption key and the second identifier to obtain the third identifier.

In implementations, the apparatus may further include a label adding module configured to add a special label to the third identifier.

Compared with existing technologies, the embodiments of the present disclosure include the following advantages.

In the embodiments of the present disclosure, after receiving a first request and/or a second request, a second identifier corresponding to a first identifier is obtained according to the first identifier carried in the first request and/or the second request. The second identifier is used as a factor for encryption and decryption. The second identifier is a sequence number used for identifying an identity of the second platform in the first platform. In other words, after encrypting a third identifier using the second identifier as an encryption factor, a fourth identifier so obtained is different for different identity of the second platform according to the embodiments of the present disclosure. As such, fourth identifiers that are returned to different second platforms by the first platform are different. Accordingly, after different second platforms perform respective services for the same third identifier, user identities returned to the second platforms are effectively isolated from each other.

Furthermore, the embodiments of the present disclosure may also return different fourth identifiers for different identities of the same second platform, thus effectively solving the difficulty of recognizing a same user identity that is returned in a situation when a single second platform has multiple identities.

DETAILED DESCRIPTION

In order to enable the foregoing objectives, features, and advantages of the present disclosure to be understood more clearly, the present disclosure is further described in detail hereinafter with reference to the accompanying drawings and exemplary implementations.

Figure 1:
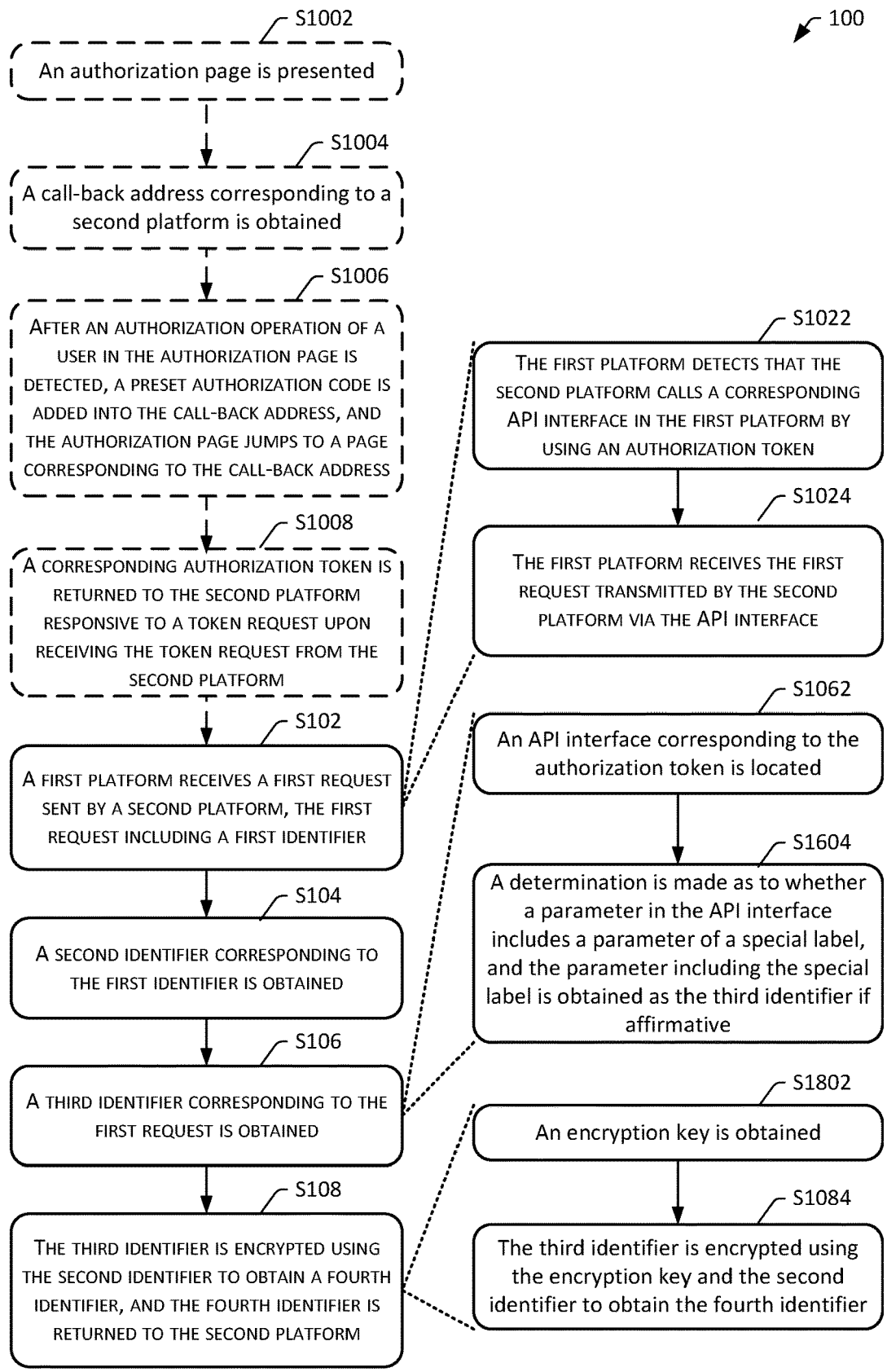
FIG. 1 is a flowchart of a first exemplary method for identifying a user identity according to the present disclosure.

FIG. 1 shows a flowchart of a first exemplary method 100 for identifying a user identity according to the present disclosure. In implementations, the method 100 may include the following operations.

At S102, a first platform receives a first request sent by a second platform, the first request including a first identifier.

In implementations, the first platform may be a service provider that provides a service, for example, a third-party payment platform, a third-party service platform, etc. The second platform may be a service requester that requests a service, for example, an external application platform (or referred to as an e-commerce platform or a partner platform) having a cooperation relationship with the third-party payment platform.

The first identifier may be a sequence number used for identifying the second platform and allocated to the second platform by the first platform after the second platform accesses the first platform.

In implementations, the second platform may access the first platform in the following manner. The second platform registers a login account with the first platform for logging on to the first platform (the login account herein is referred as to a second platform login account, i.e., a UID of the second platform, in order to be distinguished from an account of a login user in the following description). After logging on to the first platform with the second platform login account, the second platform submits a real-name authentication request. The real-name authentication request may include a business license number of a corporation corresponding to the second platform. The first platform performs a real-name authentication according to the real-name authentication request. The real-name authentication is an authentication of an Internet identity of the second platform, which may generally include verifying whether information such as the business license number corresponding to the second platform and other information is authentic. After the real-name authentication is passed, the second platform selects an access interface API in an interface database provided by the first platform as needed, and accesses the first platform through the selected access interface API. At this point, the first platform allocates a first identifier (which may be referred to as a PID (partnerID)) to the second platform to serve as an identifier of the second platform in an access relationship.

For example, if a company A wants to use a quick payment function of the third-party payment platform in a website of the company A, the company A first needs to register an account (the account is a0001, for example) with the third-party payment platform, and provides information such as a business license to apply for a real-name authentication of the account. After the third-party payment platform successfully performs the real-name authentication on the company A, the company A uses the login account a0001 to sign up a quick payment product of the third-party payment platform (i.e., the company A uses the login account a0001 to select an access interface API corresponding to the quick payment function, and accesses the third-party payment platform via the access interface API). The third-party payment platform then individually allocates an identifier, i.e., a first identifier PID, to the account a0001, and the first identifier is also used as an identifier of the website of the company A in the third-party payment platform.

In practice, the PID has an associated signature check key. When an external application platform uses the PID to interact with the third-party payment platform, the third-party payment platform uses the signature check key to perform signature check on the PID.

It should be noted that the first platform may also allocate a second identifier to the second platform after the real-name authentication of the first platform on the second platform is passed. The second identifier is a sequence number that a user of the first platform uses to identify the identity of the second platform. Generally, the second identifier is related to an identity document of the second platform, for example, the second identifier is related to a business license number of a corporation corresponding to the second platform. The second identifier may be represented as a CID (Customer ID) or Merchant ID.

In a real application, a single CID of a second platform may be registered with multiple login accounts UIDs of the second platform, and a login account UID of the second platform and may have the same value as the PID. In implementations, an association relationship of CID-UID-PID of the second platform may be generated in the first platform, and the association relationship is stored in an association database of the first platform.

In implementations, S102 may include the following operations.

At S1022, the first platform detects that the second platform calls a corresponding API interface in the first platform by using an authorization token.

In implementations, before the second platform sends a first request to the first platform to obtain resources such as protected user information from the first platform, the second platform needs to first obtain an authorization (i.e., an access permission) from the first platform. After obtaining the authorization, the second platform obtains an authorization token (Access Token), and the second platform calls a corresponding API interface in the first platform by presenting the authorization token to the first platform.

In implementations, a process of authorizing the second platform by the first platform may include the following operations.

At S1002, an authorization page is presented.

In order to ensure the security and the privacy of data, the first platform may configure a URL of an authorization page in a menu and message, and guide a user (who may be a user who wants to use the service provided by the first platform in the second platform) in a form of a link in a webpage, for example, to enter the authorization page. The user is guided to accomplish a procedure of "login and authorization" through the authorization page. In implementations, a user can be guided to fill in information of a login user account (including an account and a password) through an authorization page. After logging onto the first platform using the login user account, the user further requests user authorization.

At S1004, a call-back address corresponding to a second platform is obtained.

In implementations, when a second platform accesses the first platform, the second platform needs to fill in a call-back address of the second platform (the call-back address may be a URL of the second platform) in an access configuration file. When filling in the call-back address, a local address may be filled in if still being in a test stage. The local address may be modified to an official domain name address after the local test is passed. The first platform may obtain the call-back address corresponding to the second platform from the access configuration file of the second platform.

At S1006, after an authorization operation of a user in the authorization page is detected, a preset authorization code is added into the call-back address, and the authorization page jumps to a page corresponding to the call-back address.

The authorization page may include an "authorize" or "cancel" button. If the user selects "cancel", the page jumps to a page corresponding to the call-back address, and error information is returned at the same time. For example, error information of "error=access_denied, error_description=authorize%20reject" is returned.

If the user selects "authorize", the first platform may add an Authorization Code and other parameters, such as a state parameter and an app_id, etc., into a page request corresponding to the call-back address, and the page jumps to a page corresponding to the call-back address, to return the authorization code and other parameters to the second platform.

It should be noted that an authorization code in each user authorization is different. The authorization code can be used only once and has a validity period, and may be automatically expired if not used within the validity period. For example, if the validity period is one day and the authorization code is not used within that one day, the authorization code is expired automatically.

At S1008, a corresponding authorization token is returned to the second platform responsive to a token request upon receiving the token request from the second platform, where the token request includes the authorization code.

The authorization token (access_token) is a token used by the second platform to send a verification request (a user-related operation) on behalf of a resource owner (the user). The authorization token is a parameter that needs to be transmitted when the second platform calls the API interface of the first platform.

In implementations, after obtaining the authorization code, the second platform may generate a token request using the authorization code, and send the token request to the first platform to request the first platform to return an authorization token. In addition to the authorization code, the token request may further include AppSecret that is allocated by the first platform when the second platform accesses the first platform. The second platform then obtains the authorization token using an Http Post method, and obtains a returned value of the authorization token, which is returned in a json format. Apparently, the second platform may obtain the authorization token in other alternative methods. For example, the second platform may call an authorization token exchange API to obtain the authorization token, which is not limited in the embodiments of the present disclosure.

It should be noted that the authorization token may include information such as a functional scope, a time duration, and other attributes of an associated permission. When the authorization token exceeds the time duration, a refresh token may be used to generate a new authorization token for continuous use. The refresh token may be used repeatedly until an expiration time thereof is reached. After the refresh token is expired, the user needs to be guided to perform a re-authorization.

After obtaining the authorization token, the second platform may call the corresponding API interface. In implementations, the second platform may call the API interface by means of http calling or by https signature-free calling.

At S1024, the first platform receives the first request transmitted by the second platform via the API interface.

When the second platform calls the API interface of the first platform, the first platform may receive the first request via a gateway of the first platform. In addition to the first identifier and a first service processing parameter needed for performing service processing, the first request may further include parameters such as an API interface name, a timestamp, AppKey obtained at the time when the second platform creates an application, and an API protocol version.

At S104, a second identifier corresponding to the first identifier is obtained.

In response to obtaining the first identifier according to the first request, the first platform may match the first identifier according to an association relationship between the first identifier and a second identifier stored in an association database of the first platform, to obtain the second identifier corresponding to the first identifier. For example, a PID may be searched from data records stored in an association database of an account system in a third-party payment platform, to find a CID corresponding to the PID.

At S106, a third identifier corresponding to the first request is obtained.

In the embodiments of the present disclosure, the third identifier is an account of a login user currently logging on to the first platform, i.e., a login account UserId used by the user to log on to the first platform, which is referred to as a user UID.

In implementations, S106 may include the following operations.

At S1062, an API interface corresponding to the authorization token is located.

When the second platform calls the API interface corresponding to the first platform through the authorization token, parameter(s) transmitted by the second platform includes an API interface name. The first platform may locate the corresponding API interface according to the API interface name.

At S1064, a determination is made as to whether a parameter in the API interface includes a parameter of a special label, and the parameter including the special label is obtained as the third identifier if affirmative.

A UID that identifies a user login account may be marked in advance in the first platform. A method of marking may include adding a special label to the UID. After the gateway of the first platform locates the API interface, a parameter with a special label is recognized from among the parameter(s) of the API interface, and a determination may be made that the parameter that includes the special label is the third identifier UID.

In implementations, after determining that a third identifier exists in the currently called API interface, the first platform may perform corresponding service processing on a first service processing parameter based on the third identifier, and obtain a first service processing result. In implementations, after determining that a third identifier exists in the currently called API interface, the gateway of the first platform stores the third identifier in an interface calling context, and sends a first service processing parameter to a service system of the first platform. After receiving the first service processing parameter, the service system obtains the third identifier corresponding to the first service processing parameter from the interface calling context, to determine a specific user for whom service processing needs to be performed. The service system then performs service processing (e.g., obtaining user information such as a user address) on the first service processing parameter based on the third identifier to obtain a first service processing result, and returns the first service processing result to the gateway. The first service processing result also includes the third identifier for notifying the gateway about which user the current service processing result is specific to.

At S108, the third identifier is encrypted using the second identifier to obtain a fourth identifier, and the fourth identifier is returned to the second platform.

In implementations, in order to ensure the security of user information, a user account that is returned by the first platform to the second platform for identifying a current user is encrypted account information. In the embodiments of the present disclosure, after obtaining the first service processing result from the service system, the gateway of the first platform may obtain the third identifier corresponding to the first service processing result, and use the second identifier as one of encryption factors to encrypt the third identifier.

In implementations, S108 may include the following operations.

At S1082, an encryption key is obtained.

An encryption key for encrypting the third identifier may be configured in advance in the first platform, and the encryption key may be stored in a key management system of the first platform. When the gateway of the first platform needs to encrypt the third identifier, the corresponding encryption key is obtained from the key management system to serve as one of the encryption factors.

At S1084, the third identifier is encrypted using the encryption key and the second identifier to obtain the fourth identifier.

After the first platform obtains two encryption factors (which are the encryption key and the second identifier), the third identifier may be encrypted using these two encryption factors. In an implementation, the first platform may encrypt the third identifier using a Triple Data Encryption Algorithm (3DES). 3DES is also referred to as Triple DES, and is a mode of DES encryption algorithm, which encrypts data three times using three 56-bit keys.

The first platform may obtain the fourth identifier by encrypting the third identifier with the encryption key and the second identifier, and return the first service processing result and the corresponding fourth identifier to the second platform. The fourth identifier is a sequence number that is returned from the first platform to the second platform and is used for identifying the user. The fourth identifier may be represented as OpenID.

As a second identifier is introduced in the process of encryption to serve as one of the encryption factors according to the embodiments of the present disclosure, a fourth identifier OpenID that is returned to the second platform will be different for a different second identifier. For example, when an external application platform has multiple legal entities (for example, there are two legal entities: a corporation 1 and a corporation 2), a third-party payment platform may generate a different CID (for example, a CID1 corresponds to the corporation 1, and a CID2 corresponds to the corporation 2) for each legal entity authenticated by the first platform. If the external application platform signs with the third-party payment platform in the name of the corporation 1, the third-party payment platform encrypts a UID for the CID1 to obtain an OpenID1. If the external application platform signs with the third-party payment platform in the name of the corporation 2, the third-party payment platform encrypts the UID for the CID2 to obtain an OpenID2.

In implementations, after a first request and/or a second request is received, a second identifier corresponding to a first identifier is obtained according to the first identifier included in the first request and/or the second request, and the second identifier is used as a factor for encryption and decryption. The second identifier is a sequence number used for identifying an identity of a second platform in a first platform. In other words, in the embodiments of the present disclosure, the second identifier is used as an encryption factor to encrypt a third identifier. A fourth identifier so obtained is different for a different identity of the second platform. Accordingly, fourth identifiers returned by the first platform to different second platforms are different, thus effectively isolating user identities returned to the second platforms after these different second platforms perform a service for the same third identifier.

Furthermore, in the embodiments of the present disclosure, different fourth identifiers are returned for different subjects of authentication, thus effectively solving the difficulty of recognizing the same returned user identity in a situation where a single second platform has multiple identities.

Figure 2A:
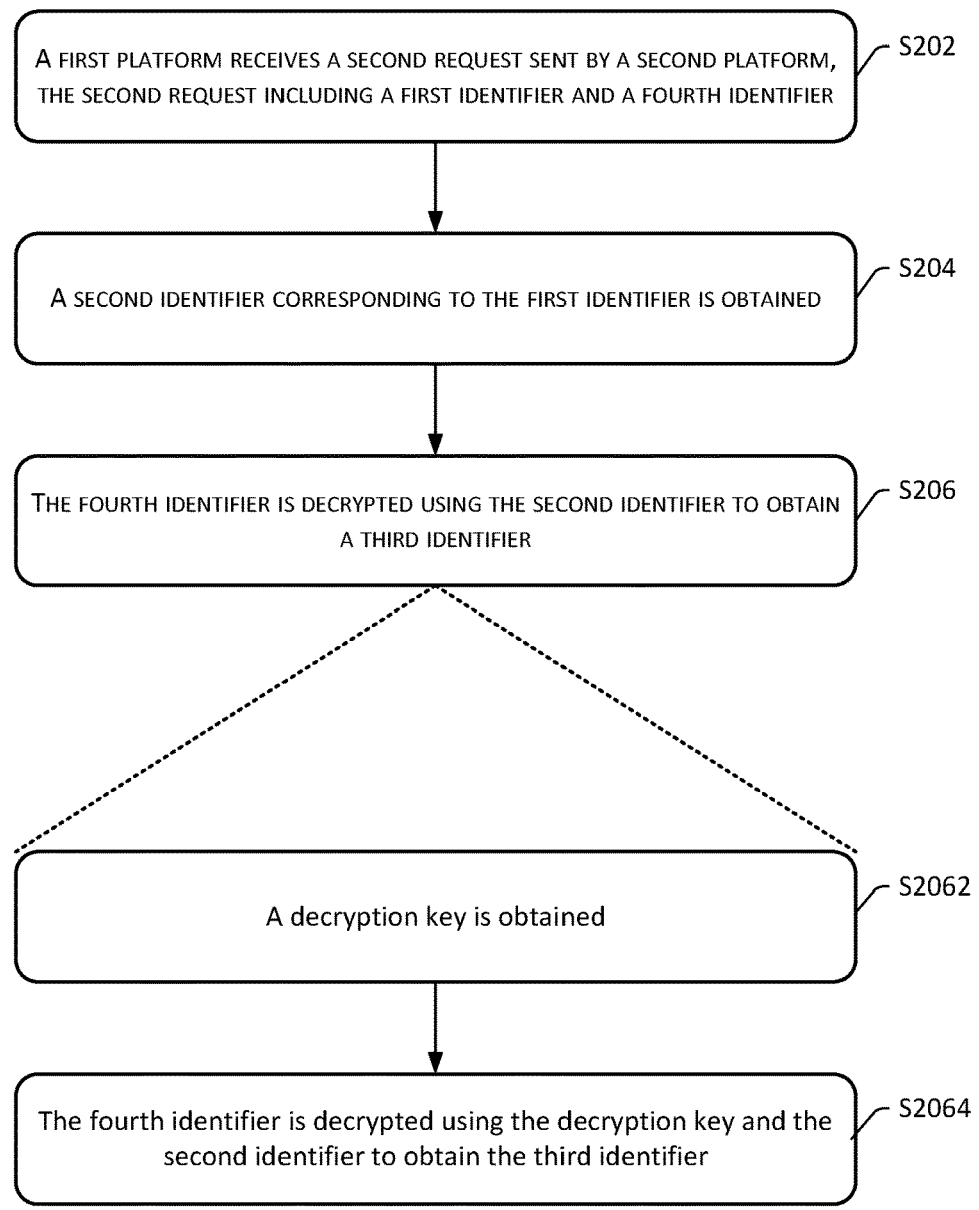
FIG. 2A is a flowchart of a second exemplary method for identifying a user identity according to the present disclosure.

FIG. 2A shows a flowchart of a second method 200 for identifying a user identity according to the present disclosure. In implementations, the method 200 may include the following operations.

At S202, a first platform receives a second request sent by a second platform, the second request including a first identifier and a fourth identifier.

In implementations, after the second platform obtains authorization from the first platform, the first platform may record the authorization, and does not need to perform the authorization again. When the second platform requests the first platform to perform service processing again based on the user authorization, the second platform may generate a second request, and transmit the second request into the first platform through the foregoing API interface. The second request may include a first identifier, a fourth identifier, a second service processing parameter, etc.

In implementations, the first identifier is a sequence number that is allocated to the second platform by the first platform and used for identifying the second platform after the second platform accesses the first platform. For example, if the second platform is an external application platform, an identity of the second platform may be a corporation of the external application platform. When the external application platform uses corporation information (e.g., a business license number) of the corporation as a supporting means and requests to sign an agreement with a third-party payment platform (i.e., the external application platform requests to access the third-party payment platform using the corporation information of the corporation as a supporting means), the third-party payment platform generates a signed order accordingly, and audits the signed order. If the audit is passed, the third-party payment platform generates a first identifier PID (partnerID) for identifying a signing subject (i.e., the corporation information of the corporation, such as the business license number), and returns the PID to the external application platform.

It should be noted that the first platform may further allocate a second identifier to the second platform of the first platform successfully performs a real-name authentication on the second platform. The second identifier is a sequence number for a user to identify an identity of the second platform in the first platform. Generally, the second identifier is related to an identity document of the second platform, for example, the second identifier is related to the business license number of the corporation corresponding to the second platform. The second identifier may be represented as a CID (Customer ID) or Merchant ID.

An association relationship between the first identifier and the second identifier may be generated in the first platform, and the association relationship is stored in an association database of the first platform.

The fourth identifier (OpenID) is a sequence number that is returned to the second platform by the first platform and is used for identifying a login user currently logging on to the first platform. The fourth identifier is a user identifier in a form of a ciphertext.

At S204, a second identifier corresponding to the first identifier is obtained, the second identifier being a sequence number for identifying an identity of the second platform in the first platform.

After obtaining the first identifier according to the second request, the first platform may obtain a second identifier corresponding to the first identifier according to an association relationship between the first identifier and the second identifier stored in an association database. For example, a PID may be searched from data records stored in an association database of an account system in a third-party payment platform to find a CID corresponding to the PID.

At S206, the fourth identifier is decrypted using the second identifier to obtain a third identifier, the third identifier being an account of a login user currently logging on to the first platform.

After obtaining the second identifier and the fourth identifier, the first platform may decrypt the fourth identifier using the second identifier. In implementations, S206 may include the following operations.

At S2062, a decryption key is obtained.

An encryption key for encrypting the third identifier and a corresponding decryption key may be configured in advance in the first platform. Furthermore, the encryption key and the decryption key may be stored in a key management system of the first platform. When a gateway of the first platform needs to decrypt the fourth identifier, the corresponding decryption key is obtained from the key management system to serve as one of a number of decryption factors.

It should be noted that the encryption key and the corresponding decryption key may be the same key if the present disclosure employs a symmetric encryption and decryption algorithm.

At S2064, the fourth identifier is decrypted using the decryption key and the second identifier to obtain the third identifier.

After obtaining two decryption factors (i.e., the decryption key and the second identifier), the first platform may decrypt the fourth identifier using the decryption key and the second identifier to obtain the third identifier. In an implementation, if the first platform performs encryption using 3DES, the first platform may perform decryption using the 3DES because the 3DES is a symmetric key encryption algorithm.

After the fourth identifier is decrypted, an original second identifier and an original third identifier are obtained. If the original second identifier is the same as the second identifier in the ciphertext, the decryption is successful. Otherwise, the decryption fails.

If the decryption is successful, the first platform may add a special label into the third identifier, store the third identifier (into which the special label is added) in an interface calling context, and forward a second service processing parameter to a service system of the first platform. After receiving the second service processing parameter, the service system obtains the third identifier from the interface calling context, performs corresponding service processing on the second service processing parameter based on the third identifier to obtain a second service processing result, and returns the second service processing result to the gateway of the first platform. The second service processing result includes the third identifier.

In response to receiving the second service processing result, the gateway encrypts the third identifier using the second identifier to obtain the fourth identifier, and returns the fourth identifier and the second service processing result to the second platform. The second platform determines the second service processing result corresponds to a processing result of which user according to the fourth identifier.

In implementations, the fourth identifier is decrypted using symmetric decryption, and the fourth identifier is decrypted based on the second identifier, thus improving the security of user information.

Because of the basic similarities with respect to the method embodiment in FIG. 1, the description of the method embodiment in FIG. 2A is relatively simple. Reference may be made to related portions of the description of the method embodiment for details.

Figure 2B:
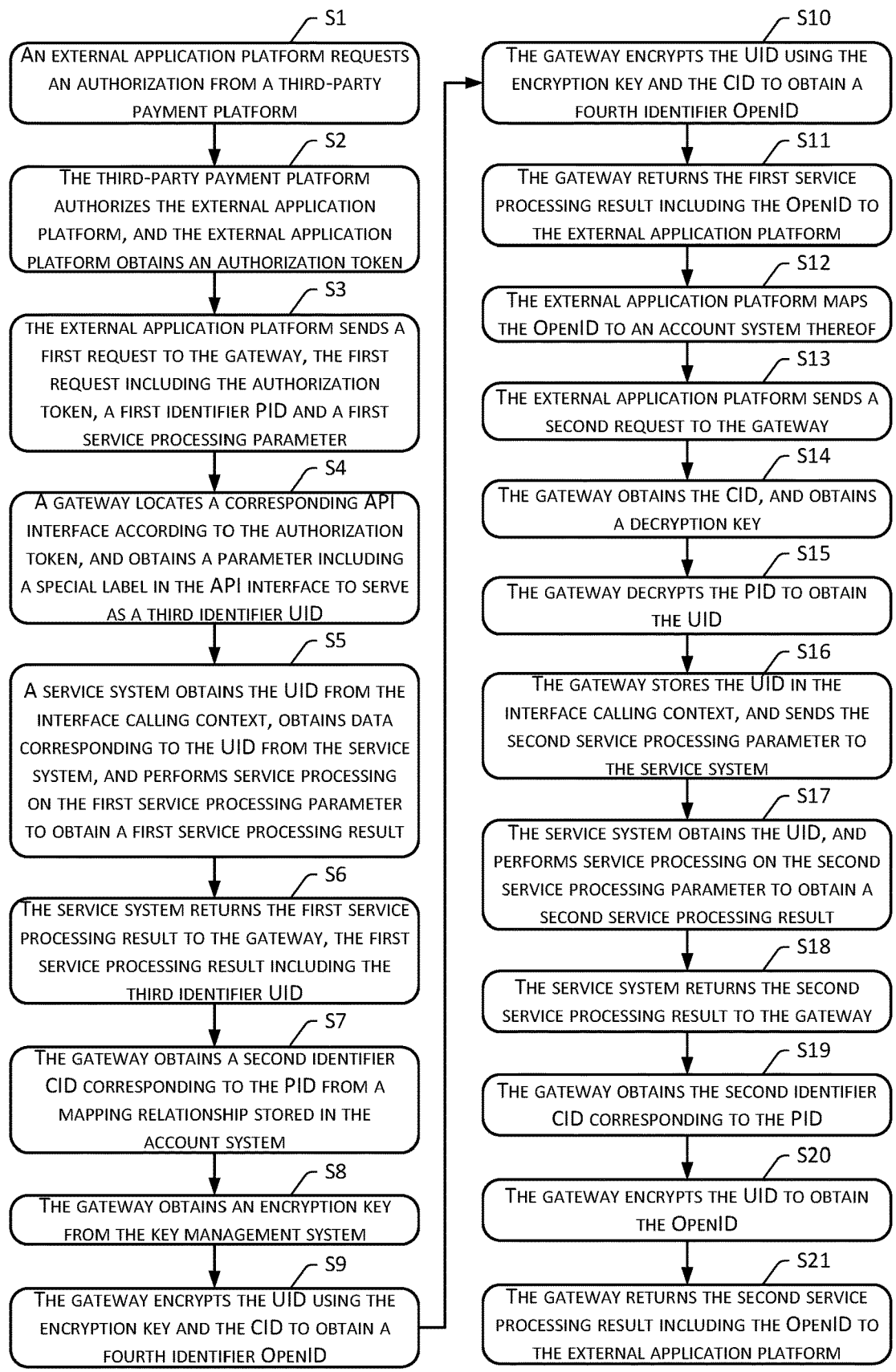
FIG. 2B is a flowchart of an example application of the methods described in FIGS. 1 and 2A in more detail.

In order to enable one skilled in the art to understand the embodiments of the present disclosure in a better manner, the embodiments of the present disclosure are described using an example as shown in FIG. 2B hereinafter. In the example, the first platform is a third-party payment platform, and the second platform is an external application platform. The third-party payment platform may include a gateway, a key management system, an account system, and a service system. The example may include the following operations.

At S1, the external application platform requests an authorization from the third-party payment platform.

At S2, the third-party payment platform authorizes the external application platform, and the external application platform obtains an authorization token.

At S3, the external application platform sends a first request to the gateway, the first request including the authorization token, a first identifier PID and a first service processing parameter.

At S4, the gateway locates a corresponding API interface according to the authorization token, and obtains a parameter including a special label in the API interface to serve as a third identifier UID.

At S5, the gateway stores the third identifier UID in an interface calling context, and sends the first service processing parameter to the service system, where the interface calling context is an interface between the service system and the gateway.

At S6, after receiving the first service processing parameter, the service system obtains the UID from the interface calling context, obtains data corresponding to the UID from the service system, and performs service processing on the first service processing parameter to obtain a first service processing result.

At S7, the service system returns the first service processing result to the gateway, the first service processing result including the third identifier UID.

At S8, after recognizing the third identifier in the first service processing result, the gateway obtains a second identifier CID corresponding to the PID from a mapping relationship stored in the account system, where the account system stores mapping relationships between PIDs and CIDs.

At S9, the gateway obtains an encryption key from the key management system.

At S10, the gateway encrypts the UID using the encryption key and the CID to obtain a fourth identifier OpenID.

At S11, the gateway returns the first service processing result including the OpenID to the external application platform.

At S12, the external application platform maps the OpenID to an account system thereof.

At S13, the external application platform sends a second request to the gateway, the second request including the OpenID, the PID and a second service processing parameter.

At S14, the gateway obtains the CID corresponding to the PID from the mapping relationship stored in the account system, and obtains a decryption key corresponding to the encryption key from the key management system.

At S15, the gateway decrypts the PID using the decryption key and the CID to obtain the UID.

At S16, the gateway stores the UID in the interface calling context, and sends the second service processing parameter to the service system.

At S17, after receiving the second service processing parameter, the service system obtains the UID from the interface calling context, and performs service processing on the second service processing parameter based on the UID to obtain a second service processing result.

At S18, the service system returns the second service processing result to the gateway, the second service processing result including the third identifier UID.

At S19, after recognizing the UID in the second service processing result, the gateway obtains the second identifier CID corresponding to the PID from the mapping relationship stored in the account system.

At S20, the gateway encrypts the UID using the encryption key and the CID to obtain the OpenID.

At S21, the gateway returns the second service processing result including the OpenID to the external application platform.

For the sake of description, it should be noted that the method embodiments are expressed as combinations of a series of actions. However, one skilled in the art should understand that the embodiments of the present disclosure are not limited by the described orders of actions, because some operations or actions may be performed in a different order or in parallel according to the embodiments of the present disclosure. Besides, one skilled in the art should also understand that the embodiments described in the specification all belong to exemplary embodiments, and the actions involved may not be essential for the embodiments of the present disclosure.

Figure 3:
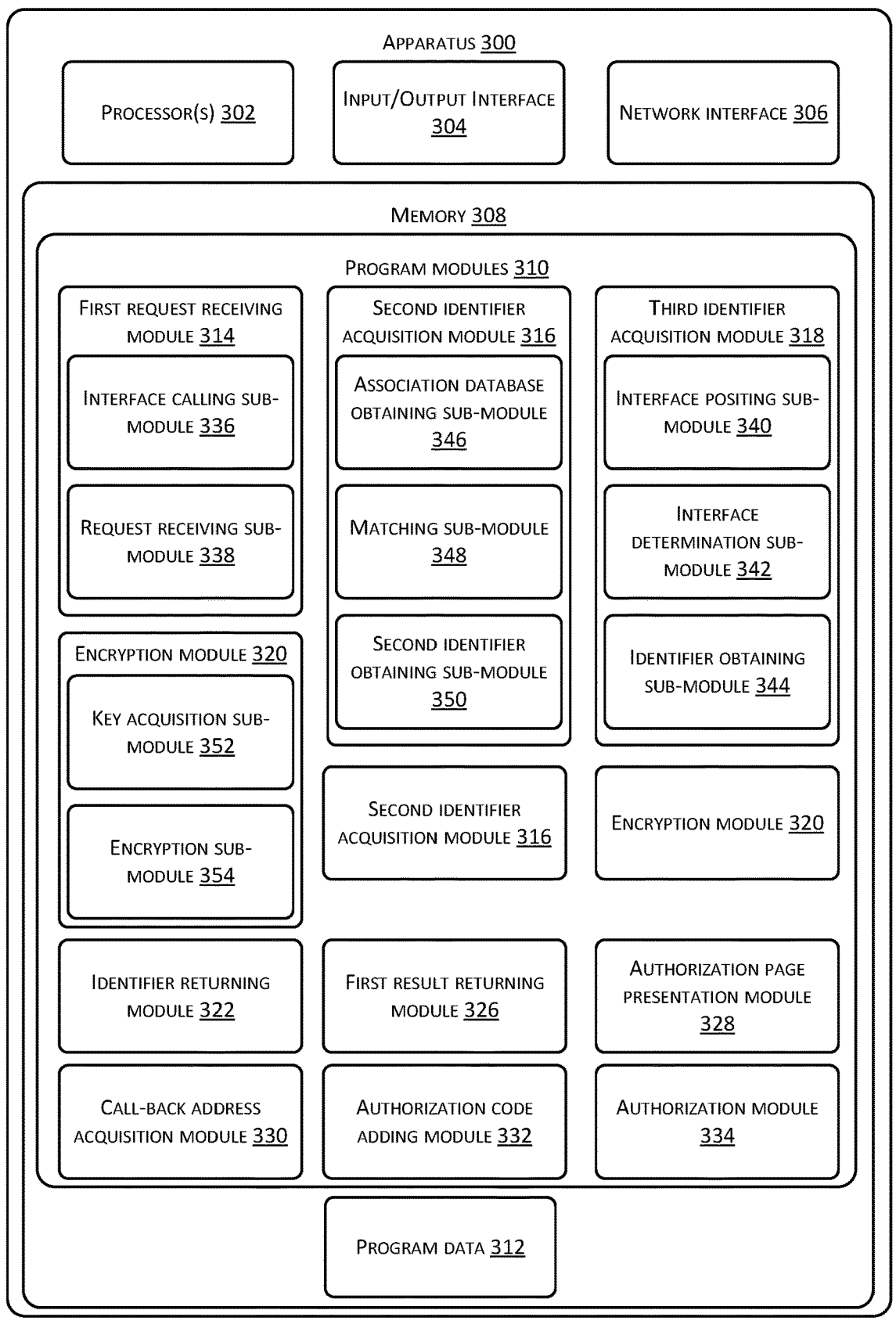
FIG. 3 is a structural block diagram of a first exemplary apparatus for identifying a user identity according to the present disclosure.

FIG. 3 shows a structural block diagram of a first exemplary apparatus 300 for identifying a user identity according to the present disclosure. In implementations, the apparatus 300 may include one or more computing devices. Alternatively, the apparatus 300 may be run or installed in one or more computing devices, and executable by the one or more computing devices. By way of example and not limitation, the apparatus 300 may include one or more processors 302, an input/output (I/O) interface 304, a network interface 306, and memory 308.

The memory 308 may include a form of computer readable media such as a volatile memory, a random access memory (RAM) and/or a non-volatile memory, for example, a read-only memory (ROM) or a flash RAM. The memory 308 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 308 may include program modules 310 and program data 312. The program modules 310 may include a first request receiving module 314, a second identifier acquisition module 316, a third identifier acquisition module 318, an encryption module 320, and an identifier returning module 322.

The first request receiving module 314 may receive a first request sent by a second platform, the first request including a first identifier, and the first identifier being a sequence number allocated to the second platform by the first platform and used for identifying the second platform after the second platform accesses the first platform.

The second identifier acquisition module 316 may obtain a second identifier corresponding to the first identifier, the second identifier being a sequence number used for identifying an identity of the second platform in the first platform.

The third identifier acquisition module 318 may obtain a third identifier corresponding to the first request, the third identifier being an account of a login user currently logging on to the first platform.

The encryption module 320 may encrypt the third identifier using the second identifier to obtain a fourth identifier, the fourth identifier being a sequence number that is returned to the second platform by the first platform and is used for identifying the user.

The identifier returning module 322 may return the fourth identifier to the second platform.

In implementations, the first request may further include a first service processing parameter, and the apparatus 300 may further include a first service processing module 324 to perform corresponding service processing on the first service processing parameter based on the third identifier to obtain a first service processing result.

In implementations, the apparatus 300 may further include a first result returning module 326 to return the first service processing result at the same time when the fourth identifier is returned to the second platform.

In implementations, the apparatus 300 may further include an authorization page presentation module 328 to present an authorization page; a call-back address acquisition module 330 to obtain a call-back address corresponding to the second platform; an authorization code adding module 332 to add an authorization code to the call-back address and jump to a page corresponding to the call-back address after an authorization operation of a user in the authorization page is detected; and an authorization module 334 to return a corresponding authorization token to the second platform responsive to the token request when a token request sent by the second platform is received, where the token request includes an authorization code.

In implementations, the first request receiving module 314 may include an interface calling sub-module 336 to detect that the second platform calls a corresponding API interface in the first platform using the authorization token; and a request receiving sub-module 338 to receive the first request that is transmitted from the second platform through the API interface.

In implementations, the third identifier includes a special label. The third identifier acquisition module 318 may include an interface positioning sub-module 340 to locate an API interface corresponding to the authorization token; an interface determination sub-module 342 to check whether parameters in the API interface include a parameter of the special label; and an identifier obtaining sub-module 344 to obtain the parameter including the special label as the third identifier in response to the parameters in the API interface including the parameter of the special label.

In implementations, the second identifier acquisition module 316 may include an association database obtaining sub-module 346 to obtain an association database, the association database including an association relationship between the first identifier and the second identifier; a matching sub-module 348 to match the first identifier in the association database; and a second identifier obtaining sub-module 350 configured to obtain the second identifier that matches the first identifier.

In implementations, the encryption module 320 includes a key acquisition sub-module 352 to obtain an encryption key; and an encryption sub-module 354 to encrypt the third identifier using the encryption key and the second identifier to obtain the fourth identifier.

Since the apparatus embodiment in FIG. 3 is basically similar to the method embodiment in FIG. 1, the description thereof is relatively simple. Reference may be made to related portions in the description of the method embodiment for details.

Figure 4:
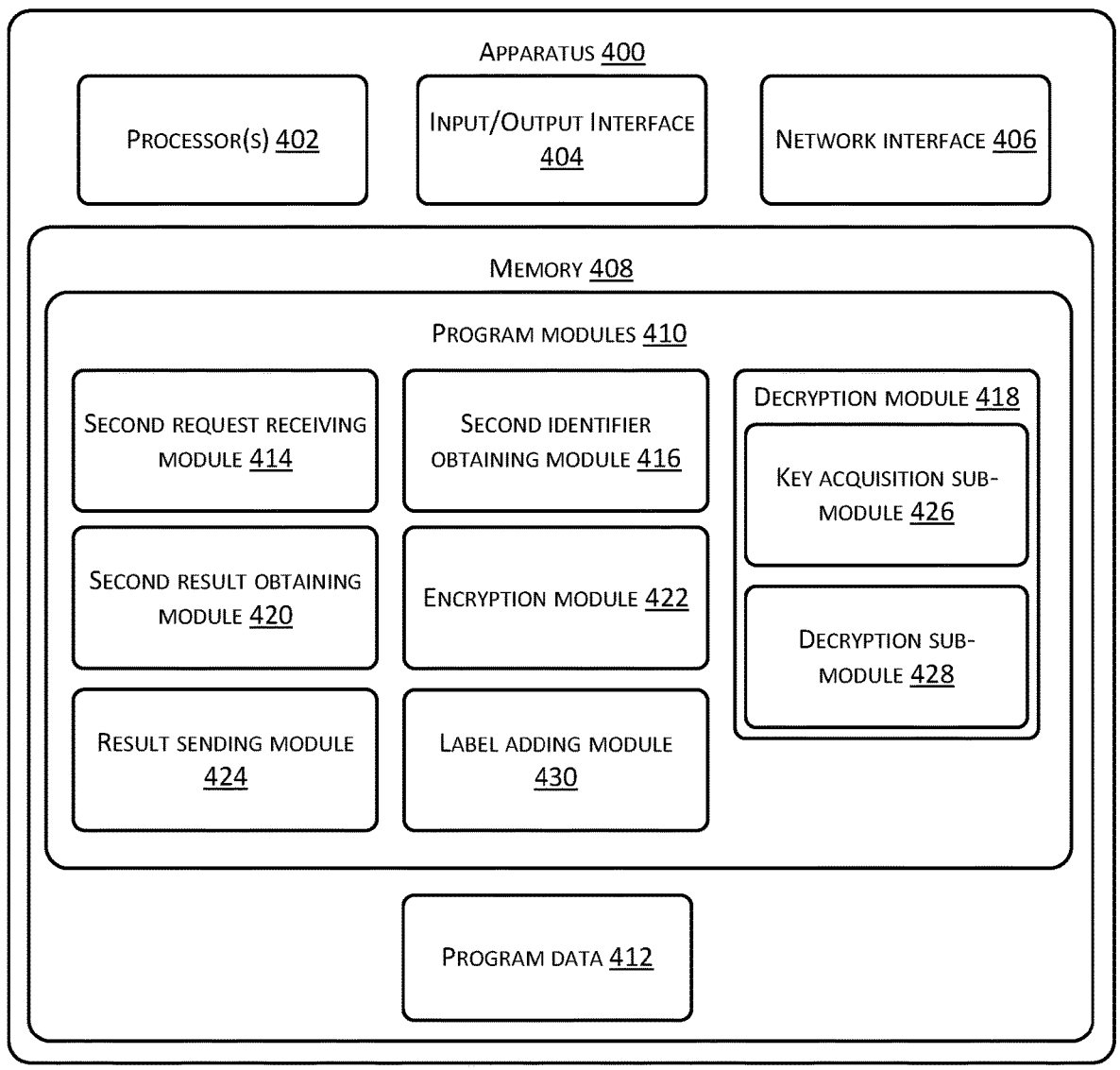
FIG. 4 is a structural block diagram of a second exemplary apparatus for identifying a user identity according to the present disclosure.

FIG. 4 shows a structural block diagram of a second exemplary apparatus 400 for identifying a user identity according to the present disclosure. In implementations, the apparatus 400 may include one or more computing devices. Alternatively, the apparatus 400 may be run or installed in one or more computing devices, and executable by the one or more computing devices. By way of example and not limitation, the apparatus 400 may include one or more processors 402, an input/output (I/O) interface 404, a network interface 406, and memory 408.

The memory 408 may include a form of computer readable media as described in the foregoing description.

In implementations, the memory 408 may include program modules 410 and program data 412. The program modules 410 may include a second request receiving module 414, a second identifier acquisition module 416, and a decryption module 418.

The second request receiving module 414 may receive a second request sent by a second platform, the second request including a first identifier and a fourth identifier, wherein the first identifier is a sequence number allocated to the second platform by the first platform and is used for identifying the second platform after the second platform accesses the first platform, and the fourth identifier is a sequence number returned to the second platform by the first platform and is used for identifying a user.

The second identifier acquisition module 416 may obtain a second identifier corresponding to the first identifier, the second identifier being a sequence number used for identifying an identity of the second platform in the first platform.

The decryption module 418 may decrypt the fourth identifier using the second identifier, to obtain a third identifier, the third identifier being a login account of the user currently logging on to the first platform.

In implementations, the second request may further include a second service processing parameter. The apparatus 400 may further include a second result obtaining module 420 to perform corresponding service processing on the second service processing parameter based on the third identifier to obtain a second service processing result; an encryption module 422 to encrypt the third identifier using the second identifier to obtain the fourth identifier; and a result sending module 424 to return the fourth identifier and the second service processing result to the second platform.

In implementations, the decryption module 418 includes a key acquisition sub-module 426 to obtain a decryption key; and a decryption sub-module 428 to decrypt the fourth identifier using the decryption key and the second identifier to obtain the third identifier.

In implementations, the apparatus 400 may include a label adding module 430 to add a special label into the third identifier.

Since the apparatus embodiment in FIG. 4 is basically similar to the method embodiment in FIG. 2A, the description thereof is relatively simple. Reference may be made to related portions in the description of the method embodiment for details.

The embodiments in the specification are described in a progressive manner. The description of each embodiment put emphases differently from those of other embodiments. Details of the same or similar parts of the embodiments may be referenced to one another.

One of ordinary skill in the art should understand that an embodiment of the present disclosure may be provided as a method, an apparatus or a computer program product. Therefore, the embodiment of the present disclosure may adopt a form of a complete hardware embodiment, a complete software embodiment or an embodiment of a combination of software and hardware. Moreover, the embodiment of the present disclosure may adopt a form of a computer program product implemented on one or more computer useable storage media (including, but not limited to, a magnetic disk memory, a CD-ROM, an optical memory, and so on) including computer usable program code.

The embodiments of the present disclosure are described with reference to flowcharts and/or block diagrams of the methods, terminal devices (systems), and computer program products according to the embodiments of the present disclosure. It should be understood that computer program instructions may be used to implement each process and/or block in the flowcharts and/or block diagrams and a combination of process(es) and/or block(s) in the flowcharts and/or the block diagrams. These computer program instructions may be provided to a general-purpose computer, a special-purpose computer, an embedded processor, or a processor of another programmable data processing terminal device to generate a machine, so that the instructions executed by a computer or a processor of another programmable data processing terminal device generate an apparatus for implementing function(s) specified in one or more processes in the flowcharts and/or in one or more blocks in the block diagrams.

These computer program instructions may also be stored in a computer readable storage device that can instruct a computer or another programmable data processing terminal device to perform operations in a particular manner, such that the instructions stored in the computer readable storage device generate an article of manufacture that includes an instruction apparatus. The instruction apparatus implements function(s) that is/are specified in one or more processes in the flowcharts and/or in one or more blocks in the block diagrams.

These computer program instructions may also be loaded onto a computer or another programmable data processing terminal device, such that a series of operations are performed on the computer or the other programmable terminal device, thereby generating computer-implemented processing. Therefore, the instructions executed on the computer or the other programmable terminal device provide a procedure for implementing function(s) specified in one or more processes in the flowcharts and/or in one or more blocks in the block diagrams.

Although exemplary embodiments of the present disclosure have been described, one skilled in the art can made other variations and modifications to the embodiments upon understanding the basic creative concepts. Therefore, the appended claims are intended to include the exemplary embodiments and all these variations and modifications that fall within the scope of the embodiments of the present disclosure.

Finally, it should also be noted that relational terms such as "first" and "second" herein are merely used to distinguish one entity or operation from another entity or operation, but do not necessarily require or imply any such relationship or order among these entities or operations in practice. Moreover, terms "include", "comprise", or any variants thereof are intended to cover a non-exclusive inclusion, such that a process, method, product or terminal device that includes a series of elements not only includes such elements but also includes other elements not specified expressly, or may further include inherent elements of the process, method, product, or terminal device. Without further restrictions, an element defined by a phrase "include a/an . . . " does not exclude other same elements to exist in a process, method, product, or terminal device that includes the element.

The methods and apparatuses for identifying a user identity according to the present disclosure are described in detail above. The principles and implementations of the present disclosure are described herein using examples. The description of the embodiments is merely provided to facilitate understanding of the methods and core ideas of the present disclosure. At the same time, one of ordinary skill in the art can make variations to exemplary implementations and scopes of application according to the ideas of the present disclosure. In summary, the content of the specification shall not be construed as limitations to the present disclosure.

The invention claimed is:

1. A method comprising:
receiving, by a first computing platform, a first request sent by a second computing platform, the first request comprising a first identifier, wherein the first identifier is used for identifying the second computing platform and is allocated to the second computing platform by the first computing platform after the second computing platform accesses the first computing platform;
obtaining a second identifier corresponding to the first identifier, the second identifier being used for identifying an identity of the second computing platform in the first computing platform;
obtaining a third identifier corresponding to the first request, the third identifier being an account of a login user registered on the first computing platform;
encrypting the third identifier using the second identifier to transform the third identifier to a fourth identifier, the fourth identifier being used for identifying the login user whose registration information on the first computing platform is encrypted based on the identity of the second computing platform; and
returning the fourth identifier to the second computing platform, the fourth identifier differentiating identity information of the login user from another identity information of the login user returned to another second computing platform.

2. The method of claim 1, wherein the first request further comprises a service processing parameter, and prior to encrypting the third identifier using the second identifier to obtain the fourth identifier, the method further comprises performing corresponding service processing on the service processing parameter based on the third identifier, to obtain a service processing result.

3. The method of claim 2, further comprising returning the service processing result when the fourth identifier is returned to the second computing platform.

4. The method of claim 1, wherein, prior to receiving, by the first computing platform, the first request sent by the second computing platform, the method further comprises:
presenting an authorization page in response to the login user accessing the first computing platform from the second computing platform;
obtaining a call-back address corresponding to the second computing platform inputted from the second computing platform;
in response to detecting an authorization operation of the login in user in the authorization page to authorize accessing the first computing platform from the second computing platform, adding a preset authorization code to the call-back address, and jumping to a page corresponding to the call-back address; and
returning a corresponding authorization token to the second computing platform responsive to a token request, upon receiving the token request sent by the second computing platform, wherein the token request comprises an authorization code.

5. The method of claim 4, wherein receiving, by the first computing platform, the request sent by the second computing platform comprises:
detecting, by the first computing platform, that the second computing platform calls a corresponding API interface in the first computing platform using the authorization token; and
receiving, by the first computing platform, the first request transmitted by the second computing platform through the API interface.

6. The method of claim 4, wherein the third identifier comprises a label, and obtaining the third identifier corresponding to the first request comprises:
locating an API interface corresponding to the authorization token;
checking whether one or more parameters in the API interface comprise a parameter that includes the label; and
obtaining the parameter that includes the label as the third identifier if affirmative.

7. The method of claim 1, wherein obtaining the second identifier corresponding to the first identifier comprises:
obtaining an association database, the association database comprising an association relationship between the first identifier and the second identifier;
searching the first identifier in the association database; and
obtaining the second identifier that matches the first identifier.

8. The method of claim 1, wherein encrypting the third identifier using the second identifier to transform the third identifier to the fourth identifier comprises:
obtaining an encryption key; and
encrypting the third identifier using the encryption key and the second identifier to transform the third identifier to the fourth identifier.

9. One or more computing-readable media storing executable instructions that, when executed by one or more processors of a first computing platform, cause the one or more processors to perform acts comprising:
receiving a first request sent by a second computing platform, the request comprising a first identifier and a fourth identifier, wherein the first identifier is used for identifying the second computing platform and is allocated to the second computing platform by the first computing platform after the second computing platform accesses the first computing platform, and the fourth identifier is returned to the second computing platform by the first computing platform and is used for identifying a login user registered on the first computing platform whose registration information on the first computing platform is encrypted based on an identity of the second computing platform in the first computing platform;
obtaining a second identifier corresponding to the first identifier, the second identifier being used for identifying the identity of the second computing platform in the first computing platform; and
decrypting the fourth identifier using the second identifier to transform the fourth identifier to a third identifier, the third identifier being an account of the login user registered on the first computing platform, the fourth identifier differentiating identity information of the login user from another identity information of the login user returned to another second computing platform.

10. The one or more computing-readable media of claim 9, wherein the request further comprises a service processing parameter, and after decrypting the fourth identifier using the second identifier to obtain the third identifier, the method further comprises:
performing corresponding service processing on the service processing parameter based on the third identifier to obtain a service processing result;
encrypting the third identifier using the second identifier to transform the third identifier to the fourth identifier; and
returning the fourth identifier and the service processing result to the second computing platform.

11. The one or more computing-readable media of claim 9, wherein decrypting the fourth identifier using the second identifier to obtain the third identifier comprises:
obtaining a decryption key; and
decrypting the fourth identifier using the decryption key and the second identifier to transform the fourth identifier to the third identifier.

12. The one or more computing-readable media of claim 9, wherein the acts further comprise adding a label to the third identifier after decrypting the fourth identifier using the second identifier to obtain the third identifier.

13. An apparatus comprising:
one or more processors;
memory;
a first request receiving module stored in the memory and that when executed by the one or more processors, receives a request sent by a second computing platform, the request comprising a first identifier, the first identifier being used for identifying the second computing platform and allocated to the second computing platform by a first computing platform after the second computing platform accesses the first computing platform;
a second identifier acquisition module stored in the memory and that when executed by the one or more processors, obtains a second identifier corresponding to the first identifier, the second identifier used for identifying an identity of the second computing platform in the first computing platform and related to an identity document of the second computing platform;
a third identifier acquisition module stored in the memory and that when executed by the one or more processors, obtains a third identifier corresponding to the first request, the third identifier being an account of a login user registered on the first computing platform;
an encryption module stored in the memory and that when executed by the one or more processors, encrypts to encrypt the third identifier using the second identifier to transform the third identifier to a fourth identifier, the fourth identifier being returned to the second computing platform by the first computing platform and used for identifying the login user whose registration information on the first computing platform is encrypted based on the identity of the second computing platform in the first computing platform; and
an identifier returning module stored in the memory and that when executed by the one or more processors, returns the fourth identifier to the second computing platform, the fourth identifier differentiating identity information of the login user from another identity information of the login user returned to another second computing platform.

14. The apparatus of claim 13, wherein the first request further comprises a service processing parameter, and the apparatus further comprises a first service processing module stored in the memory and that when executed by the one or more processors, performs corresponding service processing on the service processing parameter based on the third identifier to obtain a service processing result.

15. The apparatus of claim 14, further comprising a first result returning module stored in the memory and that when executed by the one or more processors, returns the service processing result when the fourth identifier is returned to the second computing platform.

16. The apparatus of claim 13, further comprising:
an authorization page presentation module stored in the memory and that when executed by the one or more processors, presents an authorization page in response to the login user accessing the first computing platform from the second computing platform;
a call-back address acquisition module stored in the memory and that when executed by the one or more processors, obtains a call-back address corresponding to the second computing platform inputted from the second computing platform;
an authorization code adding module stored in the memory and that when executed by the one or more processors, adds a preset authorization code to the call-back address and jumps to a page corresponding to the call-back address after an authorization operation of the login in user in the authorization page to authorize accessing the first computing platform from the second computing platform is detected; and
an authorization module stored in the memory and that when executed by the one or more processors, returns a corresponding authorization token to the second computing platform for a token request, after the token request sent by the second computing is received, wherein the token request comprises an authorization code.

17. The apparatus of claim 16, wherein the first request receiving module comprises:
an interface calling sub-module stored in the memory and that when executed by the one or more processors, detects that the second computing platform calls a corresponding API interface in the first computing platform using the authorization token; and
a request receiving sub-module stored in the memory and that when executed by the one or more processors, receives the first request transmitted by the second computing platform through the API interface.

18. The apparatus of claim 16, wherein the third identifier comprises a label, and the third identifier acquisition module comprises:
an interface positioning sub-module stored in the memory and that when executed by the one or more processors, locates the API interface corresponding to the authorization token;
an interface determination sub-module stored in the memory and that when executed by the one or more processors, checks whether one or more parameters in the API interface comprise a parameter that includes the label; and
an identifier obtaining sub-module stored in the memory and that when executed by the one or more processors, obtains parameter that includes the label as the third identifier, in response to the parameters in the API interface comprising the parameter that includes the label.

19. The apparatus of claim 13, wherein the second identifier acquisition module comprises:
an association database obtaining sub-module stored in the memory and that when executed by the one or more processors, obtains an association database, the association database comprising an association relationship between the first identifier and the second identifier;
a matching sub-module stored in the memory and that when executed by the one or more processors, searches the first identifier in the association database; and
a second identifier obtaining sub-module stored in the memory and that when executed by the one or more processors, obtains the second identifier matching the first identifier.

20. The apparatus of claim 13, wherein the encryption module comprises:
a key acquisition sub-module stored in the memory and that when executed by the one or more processors, obtains an encryption key; and
an encryption sub-module stored in the memory and that when executed by the one or more processors, encrypts the third identifier using the encryption key and the second identifier to transform the third identifier to the fourth identifier.

* * * * *